Figure 1:
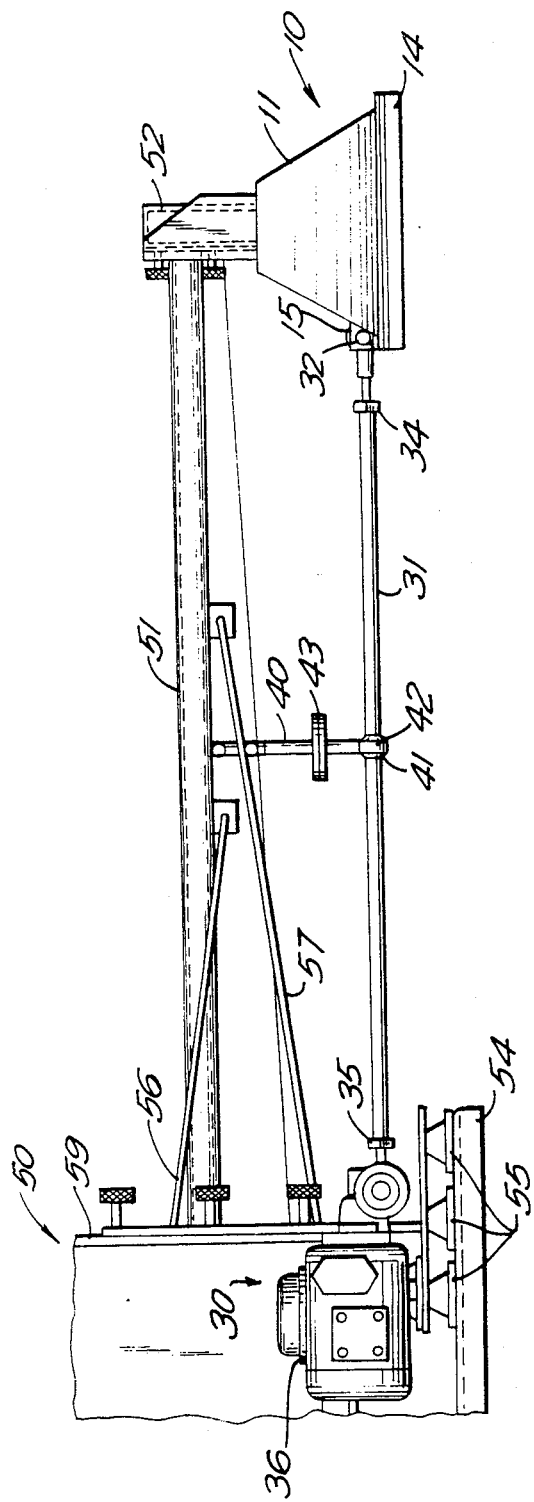

United States Patent [19]

Ricciardi

[11] Patent Number: 4,485,973

[45] Date of Patent: Dec. 4, 1984

[54] INGREDIENT SPREADER

[75] Inventor: Ronald J. Ricciardi, Woodcliff Lake, N.J.

[73] Assignee: Acrison, Inc., Moonachie, N.J.

[21] Appl. No.: 461,963

[22] Filed: Jan. 28, 1983

[51] Int. Cl.³ .............................................. A01C 15/00
[52] U.S. Cl. .................................................. 239/659
[58] Field of Search ............... 239/651, 659, 123, 228, 239/655, 664; 222/200, 199

[56] References Cited

U.S. PATENT DOCUMENTS

| 828,175 | 8/1906 | Aspinwall | 239/123 X |
| 2,152,259 | 3/1939 | Humphrey | 239/659 |
| 3,186,719 | 6/1965 | Sosalla et al. | 239/664 X |
| 3,791,558 | 2/1974 | Katusha | 222/200 X |

FOREIGN PATENT DOCUMENTS

| 651834 | 3/1979 | U.S.S.R. | 239/659 |
| 651835 | 3/1979 | U.S.S.R. | 239/659 |

Primary Examiner—Andres Kashnikow
Assistant Examiner—Mary F. McCarthy
Attorney, Agent, or Firm—Davis, Hoxie, Faithfull & Hapgood

[57] ABSTRACT

An ingredient spreader which may be readily coupled to existing feeder mechanisms so as to provide a uniform output which is dispersed in a sifting or dusting fashion over a defined area. The ingredient spreader includes a housing having an inlet at its top and an outlet at its bottom, a baffle connected centrally within the housing, a mesh screen located across the outlet of the housing, a plurality of balls which rest on the mesh screen when the ingredient spreader is not in operation, and a drive mechanism for oscillating the housing when the ingredient spreader is in operation. In operation, the drive mechanism oscillates the ingredient spreader. Ingredient is fed through the inlet at the top of the housing, passes through the housing being dispersed by the baffle, and is sifted by the balls and the screen.

23 Claims, 3 Drawing Figures

INGREDIENT SPREADER

FIELD OF INVENTION

The present invention relates to an ingredient spreader which may be readily coupled with various types of feeder mechanisms and relates particularly to an ingredient spreader providing a uniform output which is dispersed in a sifting or dusting fashion over a defined area. One embodiment of this ingredient spreader is particularly useful in the processed foods industry for controlled dispersion of powders such as seasonings for snack foods and in the plastics industry for the dispersion of additives such as lubricants added during processing.

DESCRIPTION OF THE PRIOR ART

Several types of ingredient spreaders and powder dispersion devices are presently known. A first type of device utilizes an air blower arrangement. A second type includes a rotary blade at its outlet for scattering powder product. Such devices may be enclosed within a rotating drum which serves to tumble the product to which ingredient is to be added and thereby improve the uniformity of coating or mixing. The rotating drum also serves to contain the fed ingredient as both the air blower and rotary blade arrangements tend to scatter the fed ingredient. Scattered lumps of ingredient are undesirable as they result in nonuniform coating or mixing and may result in breakage where the ingredient is used for coating items such as snack chips or crackers.

It is also known to use a multiple baffle configuration within a fixed housing located after the discharge port of a feeder. In such an arrangement, material is fed by the feeder into the top of the housing. The multiple baffles divert the downward flow of the material as it falls through the housing. Material exits the bottom of the housing as directed by the baffles.

Several vibrating arrangements are known in which a seasoning or other powder having relatively uniform size particles is fed onto one end of a slightly inclined vibrating tray. Powder falls off the other end of the tray in a spread-out waterfall-like pattern. However, nonuniform particle sizes tend to disrupt the performance of apparatus employing this simple vibrating technique.

In addition, various screw type feeders are known in which a screw or auger conveys material through a tube having holes or grooves cut in its bottom and sides or its sides only. Material falls through the holes or grooves. Inconsistent feeding occurs in such devices when the screw speed and consequently the feed rate is changed. Such feeders also require frequent maintenance as the holes or grooves tend to clog, particularly when used to feed hygroscopic materials.

SUMMARY OF THE INVENTION

The ingredient spreader of the present invention is compact, simple, and requires little maintenance or cleaning other than that regularly scheduled between shifts or when it is desired to change ingredients. A powder ingredient which will, as a practical matter, ordinarily have varying particle sizes is fed into the ingredient spreader of the present invention and is dispersed in a sifting or dusting fashion over a defined area. Lumps larger than a certain size cannot pass through the spreader and ingredient is dispersed by the spreader in a uniform and predictable manner. Normal spreader action breaks up soft or friable lumps and the spreader catches those lumps larger than a certain size which are not broken up by the normal spreading action. The spreader of the present invention has a self-cleaning action so that more uniform and cost effective coating or mixing is achieved without unacceptable clogging or frequent maintenance.

Figure 2:
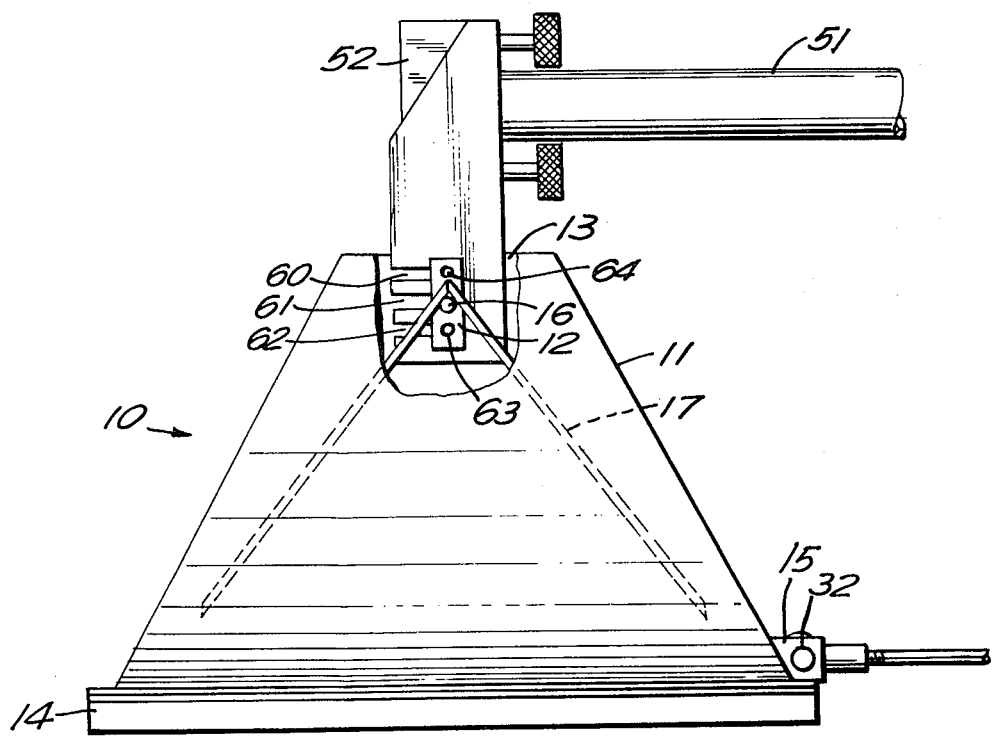
Figure 3:
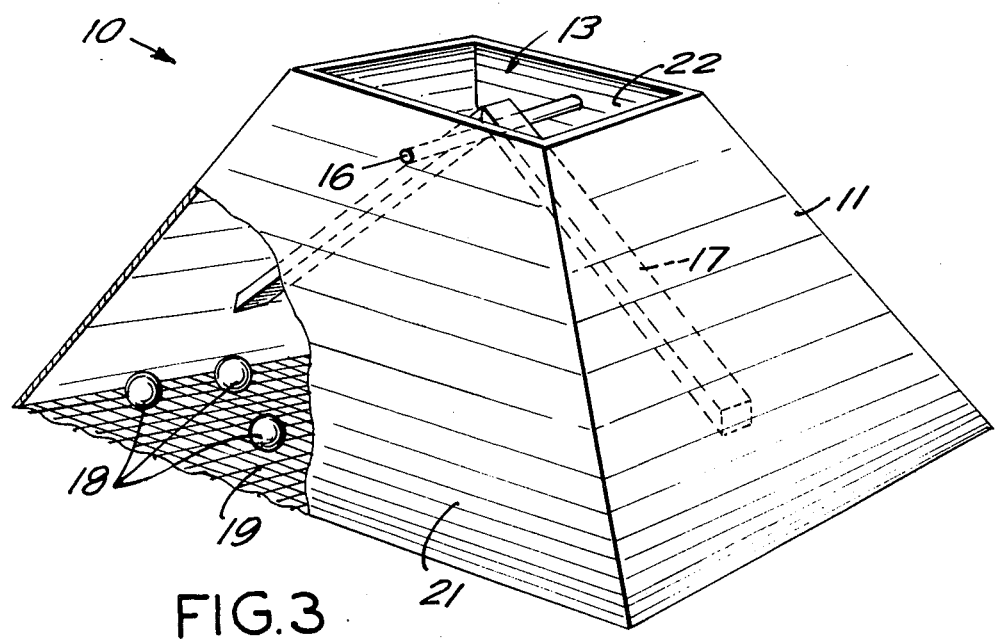

The ingredient spreader of the present invention is suitable for use with a wide range of powder types and densities. In one embodiment, it includes a pyramidal housing having an inlet at its top, a centrally located internal baffle, a mesh screen across an outlet located at its bottom, a plurality of balls which rest on top of the mesh screen when the spreader is at rest, and a drive mechanism for oscillating the housing. Powder is fed to the ingredient spreader by a known feeder mechanism and enters the spreader through the inlet in its top. The ingredient spreader is oscillated by its drive mechanism and the fed powder is uniformly dispersed within the dispersion housing as it falls onto the baffle. Uniformly dispersed powder falls from the baffle onto the mesh screen, is sifted through the screen and falls through the outlet of the ingredient spreader. The size of the mesh in the screen determines the largest particle size which will pass through the spreader. The dispersing action of the ingredient spreader is enhanced and the screen is kept clean and free from clogs as a result of the oscillation and also by the action of the balls. Normal spreader action does not interfere with the metering accuracy or feeding action of the feeder.

Other features and advantages of the invention will be clear from the drawings and the detailed description which follows.

DESCRIPTION OF THE DRAWINGS

FIG. 1 is a side view of an ingredient spreader according to the present invention and illustrates one way in which this ingredient spreader may be attached to a known feeder mechanism;

FIG. 2 is a side view illustrating in greater detail the connection of the downspout of the feeder mechanism and the ingredient spreader of FIG. 1; and FIG. 3 is a cutaway perspective view of the ingredient spreader of FIG. 1.

The figures are intended to be representational and are not necessarily drawn to scale.

DETAILED DESCRIPTION

FIGS. 1, 2 and 3 illustrate the preferred embodiment of the present invention. FIG. 1 illustrates the connection of an ingredient spreader 10, its drive means 30 which typically consists of a gearmotor drive 36 and drive arm 31, and a feeder mechanism 50. The feeder mechanism 50 is only partially shown and may be any suitable known feeder mechanism such as a Model 105 controllable auger feeder manufactured by Acrison, Inc. When such a feeder is used, the ingredient delivered to the spreader 10 can be accurately metered and controlled. Feeder mechanism 50 feeds ingredient through a discharge cylinder 51 and a downspout 52. Connecting rods 56 and 57 connect the discharge cylinder 51 to main frame 59 of the feeder mechanism 50 and provide bracing and support for discharge cylinder 51.

The internal details of spreader 10 will be discussed in greater detail in conjunction with a discussion of FIG. 3. The external details are as follows. Ingredient spreader 10 includes a housing 11 having a truncated pyramidal shape. While other housing shapes are suitable, it is desirable that the walls of the housing be inclined so that as shown for housing 11 they slope downwardly and outwardly away from the top of the housing. Such a slope helps to limit ingredient adhesion to the housing interior. As shown in FIG. 3, each of the walls has a trapezoidal shape. Housing 11 is pivotally connected to the downspout 52 by means of two synthetic bearings 12 only one of which is shown in FIG. 2 and a mounting shaft 16. Ingredient enters the spreader 10 through downspout 52 which passes through an inlet 13 in the top of housing 11. Ingredient exits the spreader 10 at its bottom 14. In operation, the spreader 10 is rapidly oscillated. While the top of the housing 11 pivots on bearings 12, the bottom 14 is rocked ¼-½ inch back and forth in the following manner. Spreader 10 is connected by a drive arm 31 to the drive 30. Drive 30 drives an eccentric shaft so that the arm 31 is alternatively pulled and pushed and spreader 10 is oscillated. Drive 30 may be operated within the range of 400-800 RPM with a typical operating speed in the range of 600-700 RPM. A too slow speed of operation fails to generate the action necessary to disperse product. A too high speed results in excessive wear with little or no added beneficial result. An optimal speed of operation depends on such factors as the ingredient being fed, its condition, and the nature of the application of the spreader. Each rotation of an output shaft of a gear-reducer attached to the drive 30 corresponds to a single oscillation of spreader 10.

As shown in FIG. 1, drive 30 is mounted on a base 54 of the feeder mechanism 50. It is desirable, however, that spreader 10 be isolated from the feeder mechanism 50 or any other attached equipment and vice versa. To insure this result, drive 30 is mounted on the base 54 using mounting pads 55 and drive arm 31 connects to the spreader housing 11 through isolating means including an isolating connector 32 and an isolator connector housing 15. A supporting connector 40 joins the mid portions of discharge cylinder 51 and drive arm 31. The drive arm 31 fits through a support bearing 41 which is housed in a bearing housing 42 connected to supporting connector 40. A support means 43 joins the upper and lower sections of connector 40.

To insure proper dispersion and spreading of ingredient, proper alignment of the spreader 10 is required. First, ingredient must be delivered from the downspout 52 nearly in the center of the pyramidal housing 11 so that ingredient is fed centrally to an internal baffle 17 which is shown in FIGS. 2 and 3. If the downspout 52 is improperly centered, product will not be uniformly dispersed by the baffle 17 in that too much ingredient will be discharged at either the front or the back of spreader 10 (i.e., to its left or right side as seen in FIG. 1). Second, the bottom 14 of spreader 10 must be level when it is in its at rest position. The apparatus of the present invention is designed so that adjustments to achieve proper alignment may be readily made. FIG. 2 illustrates in greater detail the connection of downspout 52 to ingredient spreader 10. A portion of one wall of housing 11 is cutaway in FIG. 2 to show these details. The downspout 52 includes horizontal slots 60, 61 and 62 so that the support bearings 12 can be horizontally realigned as necessary. FIG. 2 also shows holes 63 and 64 through the bearings 12 through which mounting bolts are inserted and secured with nuts once proper alignment is achieved. Also, both ends of drive arm 31 are threaded and connect so as to be adjustable. Locking nuts 34 and 35 are loosened when an adjustment to level the spreader 10 is to be made and tightened once the adjustment is made.

FIG. 3 shows a cutaway perspective view of spreader 10 and illustrates its internal details. Spreader 10 is shown in FIG. 3 disconnected from the drive arm 31 and the downspout 52 and the bearings 12 are not shown in order that the internal details of spreader 10 including, the mounting shaft 16, the baffle 17, a plurality of balls 18 and a wire mesh screen 19 may be more clearly shown. The baffle 17 consists of a single v-shaped member attached at its closed end, the end at which the legs of the v-shaped member meet, to the mounting shaft 16. The ends of the shaft 16 are welded to front and back walls 21 and 22 of housing 11 so that the closed end of the v-shaped member is centrally located within the inlet 13.

As material is fed through the inlet 13, it is dispersed by the baffle 17 as some material slides down the legs of the baffle 17 and other material slides off the edges of the legs. The angle formed by the legs of the baffle 17 is typically approximately 60°-70°. The legs of the baffle 17 both have the same width. The wire mesh screen 19 is located at the base of the housing 11 and is below the lowest portions of both legs of baffle 17. The size of the mesh in screen 19 is selected to allow passage of ingredient particles only as large as the largest allowable ingredient particle for a particular application. 30, 16 and 10 mesh or approximatley 1/32", 1/16" and ⅛" are typical mesh sizes. The plurality of balls 18 rest upon the screen 19 when spreader 10 is at rest. There is adequate clearance between the screen 19 and the lowest portions of the legs of the baffle 17 so that the balls 18 can freely move on screen 19 when spreader 10 is in operation. When spreader 10 is in operation, the balls 18 bounce on the screen 10 breaking up lumps and keeping the screen free of clogs.

In operation, any of a variety of ingredients is fed by feeder mechanism 50 through discharge cylinder 51 and downspout 52. For a typical small size ingredient spreader 10, suitable dimensions for the bottom 14 are 3 inches by 9 to 12 inches. For this small size spreader 10, the balls 18 are preferably made of synthetic material and have a diameter of approximately 1 inch. Also, the legs of the baffle 17 typically have a width of approximately 1¼ inch, the cylinder 51 has a diameter of approximately 1 inch, and the downspout 52 inlcueds a delivery cylinder having a diameter of approximately 2 inches. A typical feed rate for this small size spreader 10 ranges from 15-200 pounds per hour.

While the preferred dimensions for a small size spreader 10 have been particularly described, it will be appreciated that these dimensions may be appropriately scaled up or down to make a larger or smaller apparatus according to the invention and that the dimensions may be adjusted where necessary to suit the application.

When the downspout 52 is correctly centered within the housing 11 of spreader 10, the fed ingredient falls onto the baffle 17 which disperses the ingredient so that by the time it reaches the screen 19, it is uniformly distributed. The screen 19 sifts the ingredient as it leaves the spreader. The drive 30 drives arm 31 so that the base of the spreader 10 rocks back and forth approximately ¼-½ inch. This oscillation keeps ingredient smoothly flowing over the baffle 17 and keeps the balls 18 in motion so that ingredient is sifted by the screen 19 and so that any friable lumps caught by the screen 19 are broken-up by the balls thereby keeping screen 19 clean. The balls perform the dual functions of insuring free and uniform flow of ingredient and simultaneously of cleaning the screen 19.

The above described operation of the present invention results in a dynamic sifting of powder ingredient and the uniform spreading of ingredient over a defined area. Apparatus according to the present invention is relatively clog free and requires little cleaning beyond the normal cleaning done at a change of shift or when the fed ingredient is changed. This apparatus is simple to adjust, and when the apparatus is made of corrosion resistant material such as stainless steel or synthetic material, it requires very little maintenance.

I claim:

1. An ingredient spreader comprising
   a housing having an inlet at its top for receiving an ingredient, a front wall, a back wall, and an open bottom;
   a wire mesh screen attached across the open bottom of the housing;
   a plurality of balls;
   a baffle connected between the front and back walls of the housing, the lowest portion of the baffle being spaced above the wire mesh screen a distance greater than the diameter of said balls;
   said balls being contained within the housing when the ingredient spreader is in operation and said balls resting on the wire mesh screen when the ingredient spreader is at rest;
   means for pivotally connecting the housing to a downspout through which ingredient can be fed to the ingredient spreader; and
   drive means attached to the housing for oscillating the housing when the ingredient spreader is in operation.

2. Apparatus according to claim 1 wherein the baffle comprises a v-shaped member having two legs connected together to form a closed end, the closed end of the v-shaped member being attached to a mounting shaft which is part of the means for pivotally connecting the housing to a downspout, the ends of the mounting shaft being connected to the front and back walls of the housing so that the closed end is centered within the housing.

3. Apparatus according to claim 2 wherein the legs of the v-shaped member form an angle between 60° and 70°.

4. Apparatus according to claim 3 wherein the front and back walls slope downwardly and outwardly away from the top of the housing so that adhesion of a fed ingredient to the inside of the housing is lessened.

5. Apparatus according to claim 4 wherein all the walls of the housing have a trapezoidal shape.

6. Apparatus according to claim 4 wherein the housing is oscillated at 400 to 800 cycles per minute.

7. Apparatus according to claim 6 wherein the drive means is attached near the bottom of the housing and the range of oscillation of the housing is within the range of ¼ to ½ inch.

8. Apparatus according to claim 7 further comprising isolation means and wherein the drive means is attached to the housing by way of the isolation means.

9. Apparatus according to claim 8 wherein the drive means comprises a drive arm and a gearmotor, the drive arm connected at one end to the housing by way of the isolation means and at the other end to the gearmotor, said drive arm being threaded so that the housing can be readily leveled.

10. An ingredient spreader comprising
    a housing having an inlet at its top for receiving an ingredient, a front wall, a back wall, and an open bottom;
    a wire mesh screen attached across the open bottom of the housing;
    a plurality of balls;
    a baffle connected between the front and back walls of the housing, the lowest portion of the baffle being spaced above the wire mesh screen a distance greater than the diameter of said balls;
    said balls contained within the housing when the ingredient spreader is in operation and said balls resting on the wire mesh screen when the ingredient spreader is at rest;
    a downspout fitting within the inlet at the top of the housing;
    means for pivotally connecting the housing to the downspout;
    said downspout having at least one horizontal slot so that the means for pivotally connecting the housing to the downspout can be slidably adjusted to center the downspout with respect to the housing; and
    drive means attached to the housing for oscillating the housing when the ingredient spreader is in operation.

11. Apparatus according to claim 10 wherein the baffle comprises a v-shaped member having two legs connected together to form a closed end, the closed end of the v-shaped member being attached to a mounting shaft which is part of the means for pivotally connecting the housing to the downspout, the ends of the mounting shaft being connected to the front and back walls of the housing so that the closed end is centered within the housing.

12. Apparatus according to claim 11 wherein the legs of the v-shaped member form an angle between 60° and 70°.

13. Apparatus according to claim 12 wherein the front and back walls slope downwardly and outwardly away from the top of the housing so that adhesion of a fed ingredient to the inside of the housing is lessened.

14. Apparatus according to claim 13 wherein all the walls of the housing have a trapezoidal shape.

15. Apparatus according to claim 13 wherein the housing is oscillated at 400 to 800 cycles per minute.

16. Apparatus according to claim 15 wherein the drive means is attached near the bottom of the housing and the range of oscillation of the bottom of the housing is within the range of ¼ to ½ inch.

17. Apparatus according to claim 16 further comprising isolation means and wherein the drive means is attached to the housing by way of the isolation means.

18. Apparatus according to claim 17 wherein the drive means comprises a drive arm and a gearmotor, the drive arm connected at one end to the housing by way of the isolation means and at the other end to a gearmotor, said drive arm being threaded so that the housing can be readily leveled.

19. Apparatus comprising a feeder mechanism having a supporting base and a discharge cylinder through which ingredient is fed, a downspout connected to the discharge cylinder, and an ingredient spreader;
    the ingredient spreader comprising a housing having an inlet at its top for receiving ingredient, a front wall, a back wall, and an open bottom; a wire mesh screen attached across the open bottom of the housing; a plurality of balls; a baffle connected between the front and back walls of the housing, the lowest portion of the baffle being spaced above the wire mesh screen a distance greater than the diameter of said balls; said balls contained within the housing when the ingredient spreader is in operation and said balls resting on the wire mesh screen when the ingredient spreader is at rest; and drive means attached to the housing for oscillating the housing when the ingredient spreader is in operation;

said downspout being pivotally connected to the housing of the ingredient spreader; and said drive means including a gearmotor mounted on the base of the feeder mechanism and a drive arm connecting the gearmotor and the housing.

20. The apparatus of claim 19 wherein the drive arm passes through a support bearing in a bearing housing, the bearing housing being attached to one end of a supporting connector, and the other end of the supporting connector being attached to the discharge cylinder.

21. Apparatus according to claim 20 wherein the baffle comprises a v-shaped member having two legs connected together to form a closed end, the closed end of the v-shaped member being attached to a mounting shaft which is part of the means for pivotally connecting the housing to the downspout, the ends of the mounting shaft being connected to the front and back walls of the housing so that the closed end is centered within the housing.

22. Apparatus according to claim 21 wherein the legs of the v-shaped member form an angle between 60° and 70°.

23. An ingredient spreader comprising a housing having an inlet at its top for receiving an ingredient, an open bottom for discharging the ingredient and side walls for containing the ingredient as it passes through the housing, said side walls sloping downwardly and outwardly away from the top of the housing so that adhesion of the ingredient to the inside of the housing is lessened as it passes through the housing;

a wire mesh screen attached across the open bottom of the housing;

a plurality of balls;

a baffle connected between the side walls of the housing, the lowest portion of the baffle being spaced above the wire mesh screen a distance greater than the diameter of said balls;

said balls being contained within the housing when the ingredient spreader is in operation and said balls resting on the wire mesh screen when the ingredient spreader is at rest;

means for pivotally connecting the housing to a downspout through which ingredient can be fed to the ingredient spreader; and drive means attached to the housing for oscillating the housing when the ingredient spreader is in operation.

* * * * *